United States Patent
Heo et al.

(10) Patent No.: US 9,312,573 B2
(45) Date of Patent: Apr. 12, 2016

(54) BATTERY PACK

(71) Applicant: SAMSUNG SDI CO., LTD., Yongin-si, Gyeonggi-do (KR)

(72) Inventors: Sangdo Heo, Yongin-si (KR); Jonghwa Hur, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 249 days.

(21) Appl. No.: 14/042,164

(22) Filed: Sep. 30, 2013

(65) Prior Publication Data
US 2014/0356687 A1  Dec. 4, 2014

(30) Foreign Application Priority Data

May 28, 2013 (KR) .......... 10-2013-0060514

(51) Int. Cl.
*H01M 2/26* (2006.01)
*H01M 10/42* (2006.01)
*H01M 2/10* (2006.01)
*H01M 2/30* (2006.01)
*H01M 2/34* (2006.01)
*H01M 2/04* (2006.01)

(52) U.S. Cl.
CPC .......... *H01M 10/425* (2013.01); *H01M 2/1061* (2013.01); *H01M 2/1094* (2013.01); *H01M 2/30* (2013.01); *H01M 2/34* (2013.01); *H01M 2/0473* (2013.01); *H01M 2010/4271* (2013.01); *H01M 2200/10* (2013.01)

(58) Field of Classification Search
CPC ..................................................... H01M 2/0473
See application file for complete search history.

(56) References Cited

U.S. PATENT DOCUMENTS

2008/0187823 A1* 8/2008 Byun et al. .................... 429/122
2010/0323225 A1* 12/2010 Lee .................................. 429/7
2012/0301748 A1* 11/2012 Choi ............................... 429/7

FOREIGN PATENT DOCUMENTS

| KR | 10-2007-0022888 | 2/2007 |
| KR | 10-2008-0038663 | 5/2008 |
| KR | 10-2009-0026650 | 3/2009 |

* cited by examiner

Primary Examiner — Jane Rhee
(74) Attorney, Agent, or Firm — Lewis Roca Rothgerber Christie LLP

(57) ABSTRACT

A battery pack includes a battery cell; an insulation holder coupled to the battery cell, the insulation holder having a fixing hole; and a protection circuit module coupled to the insulation holder, the protection circuit module having a fixing tab, wherein the fixing tab is fixed to the battery cell through the fixing hole.

15 Claims, 7 Drawing Sheets

BATTERY PACK

CROSS-REFERENCE TO RELATED APPLICATION

This application claims priority to and the benefit of Korean Patent Application No. 10-2013-0060514 filed on May 28, 2013, in the Korean Intellectual Property Office, the entire disclosure of which is incorporated herein by reference.

BACKGROUND

1. Field

Embodiments of the present invention relate to a battery pack.

2. Description of the Related Art

In general, a battery pack includes a battery cell and a protection circuit module for protecting the battery cell from over-charging or over-discharging. The battery cell may be a lithium ion secondary battery, and the protection circuit module may be a circuit board having a protection circuit device and an external terminal formed thereon.

Occasionally, when the external terminal of the protection circuit module is positioned at a region approximately 6.5 mm away from short side surfaces of the battery cell, it is difficult to fix the protection circuit module due to interference between the external terminal and a fixed region of the protection circuit module. In other words, a particular region of the protection circuit module corresponding to the external terminal is not fixed to the battery cell.

Therefore, if the particular region of the protection circuit module corresponding to the external terminal is not fixed to the battery cell, the protection circuit module may be delaminated or deviated from the battery cell, and the protection circuit module may be damaged due to external shocks.

SUMMARY

An aspect of the present invention provides a battery pack which can stably fix a protection circuit module to a battery cell by an insulation holder provided between the protection circuit module and the battery cell.

Another aspect of the present invention provides a battery pack which can stably couple a protection circuit module to a battery cell by electrically connecting a conductive tab to one side of the protection circuit module, the conductive tab being electrically stably fixed to the battery cell while passing through an insulation holder, and attaching a fixing tab to the other side of the protection circuit module, the fixing tab being coupled to the insulation holder in a hook manner while being coupled to the battery cell in a non-welding manner.

Still another aspect of the present invention provides a battery pack which can prevent a protection circuit module from being delaminated or deviated from a battery cell by coupling the protection circuit module to the insulation holder in a hook manner and coupling the protection circuit module to the battery cell in a non-welding manner even when a distance between an external terminal formed at one side of the protection circuit module and short side surfaces of the battery cell is less than about 6.5 mm.

According to at least one of embodiments, there is provided a battery pack including a battery cell, an insulation holder couple to the battery cell, and a protection circuit module coupled to the insulation holder, wherein a fixing hole is formed in the insulation holder, a fixing tab is attached to the protection circuit module, and the fixing tab is fixed to the battery cell through the fixing hole.

The battery cell may include short side surfaces, the protection circuit module may include an external terminal, and a distance between the short side surfaces and the external terminal may be smaller than 6.5 mm.

The battery cell may further include a protruding fixing member, the fixing member is coupled to the fixing hole formed in the insulation holder, and the fixing tab makes contact with or is inserted into the fixing member.

The fixing member may be shaped of a rectangular parallelepiped with which the fixing tab makes contact.

The fixing member may include first and second regions parallel to each other to allow the fixing tab to be inserted into a portion therebetween; and a third region connecting the first and second regions.

Each of the first and second regions may include a chamfer.

The fixing tab may include a first region attached to the protection circuit module; a second region making contact with or inserted into the fixing member; and a third region connecting the first region and the second region.

The insulation holder may be adhered to the battery cell by an adhesion member.

The insulation holder may include a bottom surface adhered to the battery cell; and side surfaces extending away from the bottom surface to mount the protection circuit module thereon, wherein the fixing hole is formed to extend over the bottom surface and the side surfaces.

The protection circuit module may include a circuit board having a first throughhole and a second throughhole spaced apart from each other; a first conductive tab positioned at a region corresponding to the first throughhole and electrically connecting the battery cell and the circuit board; and a second conductive tab positioned at a region corresponding to the second throughhole and electrically connecting the battery cell and the circuit board.

The insulation holder may include a first opening formed at a location corresponding to the first throughhole, and a second opening formed at a location corresponding to the second throughhole.

The battery cell may further include an electrode terminal, the electrode terminal is positioned inside the first opening, and the first conductive tab is connected to the electrode terminal.

The battery cell may further include a cap plate and the second conductive tab is connected to the cap plate while passing through the second opening.

The second conductive tab may include a first region electrically connected to the circuit board; a second region electrically connected to the cap plate; and a third region connecting the first region and the second region, wherein the second region is formed at locations corresponding to the second throughhole and the second opening.

The insulation holder may further include a third opening spaced apart from the first and second openings, and the battery cell further includes an injection hole plug formed at a location corresponding to the third opening.

The battery pack may further include an upper cover coupled to the battery cell while surrounding the insulation holder and the protection circuit module.

The battery pack may further include a label wrapping the battery cell and the upper cover.

As described above, according to embodiments of the present invention, a protection circuit module can be stably fixed to a battery cell by an insulation holder provided between the protection circuit module and the battery cell.

In addition, a protection circuit module can be stably coupled to a battery cell by electrically connecting a conductive tive tab to one side of the protection circuit module, the conductive tab being electrically stably fixed to the battery cell while passing through an insulation holder, and attaching a fixing tab to the other side of the protection circuit module, the fixing tab being coupled to the insulation holder in a hook manner while being coupled to the battery cell in a non-welding manner.

Further, a protection circuit module can be prevented from being delaminated or deviated from a battery cell by coupling the protection circuit module to the insulation holder in a hook manner and coupling the protection circuit module to the battery cell in a non-welding manner even when a distance between an external terminal formed at one side of the protection circuit module and short side surfaces of the battery cell is less than 6.5 mm.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain principles of the present disclosure. In the drawings.

DETAILED DESCRIPTION

Figure 1:
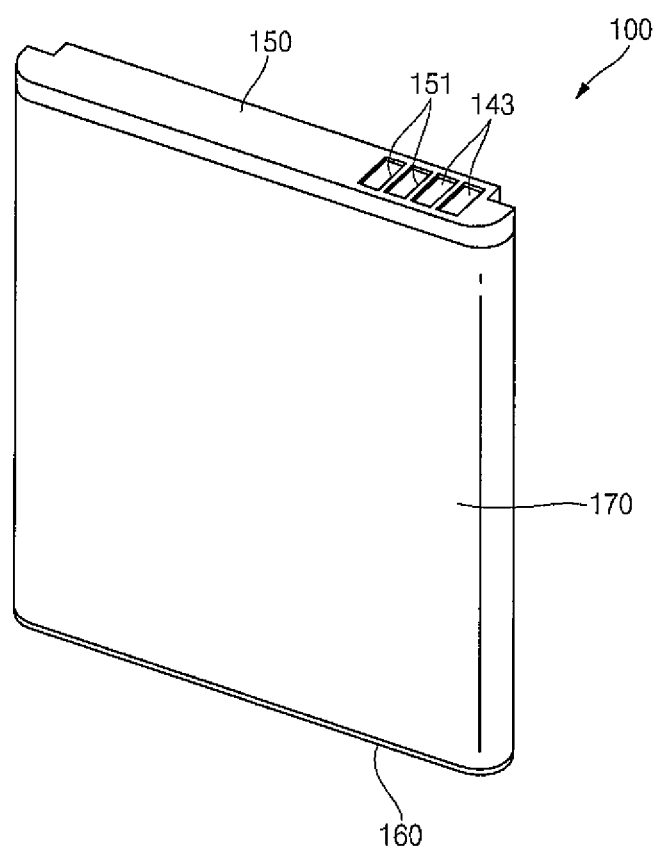
FIG. 1 is a perspective view of a battery pack according to an embodiment of the present invention.

Hereinafter, examples of embodiments of the invention will be described in detail with reference to the accompanying drawings.

The present invention may be embodied in many different forms and should not be construed as being limited to the embodiments set forth herein. Rather, these embodiments of the invention are provided so that this disclosure will be thorough and complete and will fully convey the concept of the invention to those skilled in the art, and the present invention will only be defined by the appended claims.

In the drawings, the thickness of layers and regions are exaggerated for clarity. Here, like reference numerals refer to like elements throughout. As used herein, the term "and/or" includes any and all combinations of one or more of the associated listed items.

In addition, the terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present invention.

Figure 2:
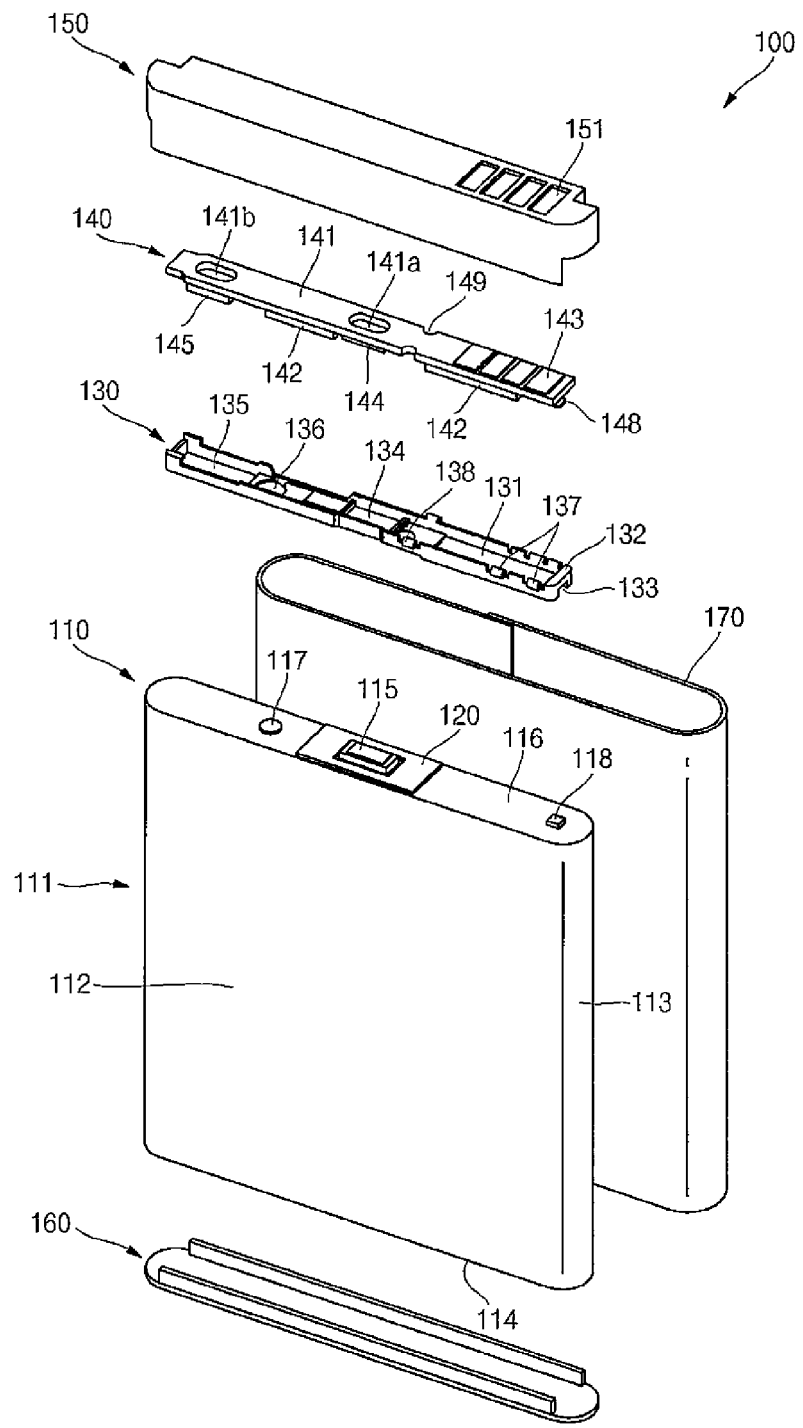
FIG. 2 is an exploded perspective view of the battery pack shown in FIG. 1.

FIG. 1 is a perspective view of a battery pack according to an embodiment of the present invention and FIG. 2 is an exploded perspective view of the battery pack shown in FIG. 1.

Referring to FIGS. 1 and 2, the battery pack 100 according to the embodiment of the present invention includes battery pack 100 includes a battery cell 110, an adhesion member 120, an insulation holder 130, a protection circuit module 140, an upper cover 150, a lower cover 160 and a label 170.

The battery cell 110 includes a prismatic can 111, an electrode assembly, an electrode terminal 115 and a cap plate 116. The electrode assembly is received in the can 111 through an opening formed at one side of the can 111 and the opening is sealed by the cap plate 116. The battery cell 110 has electrically positive and negative electrodes, and is the minimum unit of the battery pack 100 performing charging and discharging. Here, the prismatic can 111 may also be defined as a prismatic case.

The can 111 is formed in a substantially flat rectangular parallelepiped having a hollow. In one embodiment, the can 111 has two relatively wide long side surfaces 112, two relatively narrow short side surfaces 113 connecting the two long side surfaces 112, and a bottom surface 114 connecting the two long side surfaces 112 and the two short side surfaces 113. An opening is formed in the opposite direction of the bottom surface 114. The two short side surfaces 113 may be curved. The can 111 may be made of at least one selected from the group consisting of aluminum, an aluminum alloy, iron, an iron alloy, stainless steel and equivalents thereof, but not limited thereto. In addition, the can 111 itself may serve as an electrode terminal (e.g., a positive electrode terminal).

The electrode assembly may include a positive electrode plate, a negative electrode plate and a separator. The separator may be positioned between the positive electrode plate and the negative electrode plate, and the electrode assembly is generally rolled into a jelly-roll configuration or stacked. The electrode assembly may be inserted into the can 111 through the opening of the can 111. The electrode assembly is received in the can 111, together with an electrolytic solution.

Side surfaces of the electrode terminal 115, excluding top and bottom surfaces thereof, are surrounded by an insulation gasket, and the electrode terminal 115 may be upwardly protruded and/or exposed while passing through the cap plate 116. In addition, the electrode terminal 115 may be electrically connected to, for example, a negative electrode plate, and the cap plate 116 may be electrically connected to, for example, a positive electrode plate. Therefore, the electrode terminal 115 may have a negative polarity, and the cap plate 116 and the can 111 may have positive polarity.

As described above, the cap plate 116 seals the opening of the can 111, thereby preventing the electrode assembly and the electrolytic solution received in the can 111 from being dislodged and leaked to the outside. Accordingly, the cap plate 116 is welded to a top end of the can 111.

In addition, an injection hole for allowing the injection of the electrolytic solution is formed in the cap plate 116, and a plug 117 may be engaged with the injection hole. Further, a fixing member 118 to which a fixing hole 133 of the insulation holder 130 protrudes from the cap plate 116 away from the electrode assembly. In other words, the upwardly protruding fixing member 118 may be formed in a region opposite to the plug 117 with respect to the electrode terminal 115. The fixing member 118 may be substantially shaped as a cube or a rectangular parallelepiped, but aspects of the present invention are not limited thereto. In addition, the fixing member 118 may be formed by being adhered to the cap plate 116 or being integrally protruded from the cap plate 116.

The adhesion member 120 is positioned on the cap plate 116 of the battery cell 110. The adhesion member 120 may entirely or partially cover the cap plate 116. In FIG. 2, the adhesion member 120 covers a region of the cap plate 116 at exterior sides of the electrode terminal 115, but aspects of the present invention are not limited thereto. The adhesion member 120 adheres the insulation holder 130 to the cap plate 116 of the battery cell 110. In addition, the adhesion member 120 may be at least one selected from the group consisting of a double sided adhesive tape, a double sided adhesive film, a liquid adhesive, and equivalents thereof, but aspects of the present invention are not limited thereto.

As described above, the insulation holder 130 is fixed to the battery cell 110. In detail, the insulation holder 130 is adhered to the cap plate 116 of the battery cell 110 by the adhesion member 120, and the fixing hole 133 provided in the insulation holder 130 is engaged with the fixing member 118 provided in the cap plate 116. In other words, the fixing member 118 formed in the cap plate 116 is engaged with the fixing hole 133 provided in the insulation holder 130.

The insulation holder 130 includes a bottom surface 131 adhered to the cap plate 116 by the adhesion member 120 and side surfaces 132 extending away from the bottom surface 131 to mount the protection circuit module 140. In one embodiment, the fixing hole 133 is formed in the bottom surface 131 and the side surfaces 132. In other words, the fixing hole 133 is formed at a region generally corresponding to the fixing member 118 of the cap plate 116, specifically, at a boundary region between the bottom surface 131 and the side surfaces 132, while extending over the bottom surface 131 and the side surfaces 132.

Therefore, while the insulation holder 130 is adhered to the cap plate 116 by the adhesion member 120, the fixing hole 133 is engaged with the fixing member 118, thereby preventing the insulation holder 130 from moving in a vertical or horizontal direction with respect to the battery cell 110 or being dislodged. Here, the vertical direction means a vertical axis with respect to the battery cell 110 and the horizontal direction means a horizontal axis perpendicular to the vertical axis.

In addition, the insulation holder 130 includes a first opening 134, a second opening 135 and a third opening 136 formed in the bottom surface 131 to be spaced from each other. In one embodiment, the first opening 134 is formed at a region substantially corresponding to the first conductive tab 144 of the protection circuit module 140 to be described later and the electrode terminal 115 of the battery cell 110, the second opening 135 is formed at a region substantially corresponding to the second conductive tab 145 of the protection circuit module 140, and the third opening 136 is formed at a region substantially corresponding to the plug 117 coupled to the cap plate 116.

A first coupling protrusion 137 is configured to be engaged with the upper cover 150 to be described later, and second coupling protrusion 138 is configured to be engaged with the upper cover 150 to be described later and the protection circuit module 140.

The insulation holder 130 may be generally made of an insulting plastic material, a surface-insulated metal, or a ceramic, but the present invention does not limit the material of the insulation holder 130 to those listed herein.

The protection circuit module 140 is mounted in the insulation holder 130 and is electrically and mechanically connected to the battery cell 110. To this end, the protection circuit module 140 has a first throughhole 141a and a second throughhole 141b and includes a circuit board 141 having a plurality of protection circuit devices 142 mounted on its bottom surface and a plurality of external terminals 143 formed on its top surface. In one embodiment, the circuit board 141 may be generally one selected from a rigid circuit board, a flexible circuit board and equivalents thereof, but not limited thereto. A recessed groove or notch is engaged with the second coupling protrusion 138 formed in the insulation holder 130.

In addition, in the protection circuit module 140, the first conductive tab 144 is electrically connected to the circuit board 141 in the vicinity of a bottom portion of the first throughhole 141a, and the second conductive tab 145 is electrically connected to the circuit board 141 in the vicinity of a bottom portion of the second throughhole 141b. In one embodiment, the first throughhole 141a of the circuit board 141 is formed at a region corresponding to the first opening 134 of the insulation holder 130, and the second throughhole 141b of the circuit board 141 is formed at a region corresponding to the second opening 135 of the insulation holder 130.

The protection circuit module 140 includes a fixing tab 148 attached to one side of the bottom surface of the circuit board 141 corresponding to the external terminal 143. The fixing tab 148 may be electrically connected to or mechanically fixed to the circuit board 141. In addition, the fixing tab 148 is coupled to the battery cell 110 in a hook manner and/or a non-welding manner while passing through the fixing hole 133 provided in the insulation holder 130 b. The fixing tab 148 may be made of at least one selected from the group consisting of nickel, copper, aluminum, and equivalents thereof, but aspects of the present invention are not limited thereto.

In addition, the fixing tab 148 is particularly advantageous when a distance between the external terminal 143 and the short side surface 113 of the battery cell 110 is smaller than approximately 6.5 mm. In other words, when the distance between the external terminal 143 of the circuit board 141 and the short side surface 113 of the can 111 adjacent thereto is smaller than approximately 6.5 mm, a welding region is not secured in a conventional conductive tab, making it difficult to fix a protection circuit module to a battery cell by the conductive tab. However, in the present invention, the fixing tab 148 attached to the bottom surface of the circuit board 141 passes through the fixing hole 133 of the insulation holder 133 to then make contact with and/or to be fixed to the battery cell 110 in a hook manner and/or a non-welding manner, thereby preventing the protection circuit module 140 from being deformed due to delamination or deviation from the battery cell 110.

The upper cover 150 covers a top portion of the battery cell 110, and the lower cover 160 covers a bottom portion of the battery cell 110. In more detail, the upper cover 150 covers some portions of the long side surfaces 112 of the battery cell 110 while covering the protection circuit module 140 and the insulation holder 130. In addition, the upper cover 150 includes a plurality of openings 151, thereby allowing the plurality of external terminals 143 formed in the protection circuit module 140 to be exposed to the outside. The upper cover 150 and the lower cover 160 may be pre-formed using a general plastic resin. Thereafter, the upper cover 150 may be coupled to the protection circuit module 140 and the insulation holder 130 positioned on the top portion of the battery cell 110 in an interference fit manner. In addition, the lower cover 160 may be coupled to the bottom portion of the battery cell 110 in an interference fit manner. Further, after the protection circuit module 140, the insulation holder 130 and the battery cell 110 are placed in a mold, the upper cover 150 and the lower cover 160 may be formed by injecting the melted plastic resin into the mold and cooling the same.

The label 170 covers some portions of the upper cover 150 and the lower cover 160 while covering all of the long side surfaces 112 and the short side surfaces 113 of the battery cell 110. Therefore, the protection circuit module 140 and the insulation holder 130 positioned inside the upper cover 150 are not deviated to the outside, and the upper cover 150 and the lower cover 160 are firmly and stably fixed to the battery cell 110. Here, various types of information, including a product name, a trademark, product contents, size, capacity, production date, production, marketing and use methods, etc., are written on the outer surface of the label 170, and an adhesive layer is formed on the inner surface of the label 170. In addition, the label 170 includes an adhesive layer formed on its one surface, and may be formed of a surface-treated polyethylene film, or a surface-treated polyester film, but the present invention does not limit the material of the label 170 to those listed herein.

In one embodiment, instead of the label 170, a hard external case made of a rigid plastic material may be used. In this case, an adhesive agent is coated on the inner surface of the hard external case, thereby allowing the battery cell 110, the upper cover 150 and the lower cover 160 to be integrally coupled to the hard external case.

As described above, in the battery pack 100 according to the embodiment of the present invention, the first and second conductive tabs 144 and 145 are electrically connected to one side of the protection circuit module 140 and pass through the insulation holder 130 to then be electrically stably fixed to the battery cell 110. In addition, the fixing tab 148 is attached to the other side of the protection circuit module 140 and passes through the fixing hole 133 of the insulation holder 130 to then be fixed to the battery cell 110 in a hook manner and/or a non-welding manner, the protection circuit module 140 is firmly and stably fixed to the battery cell 110.

Figure 3A:
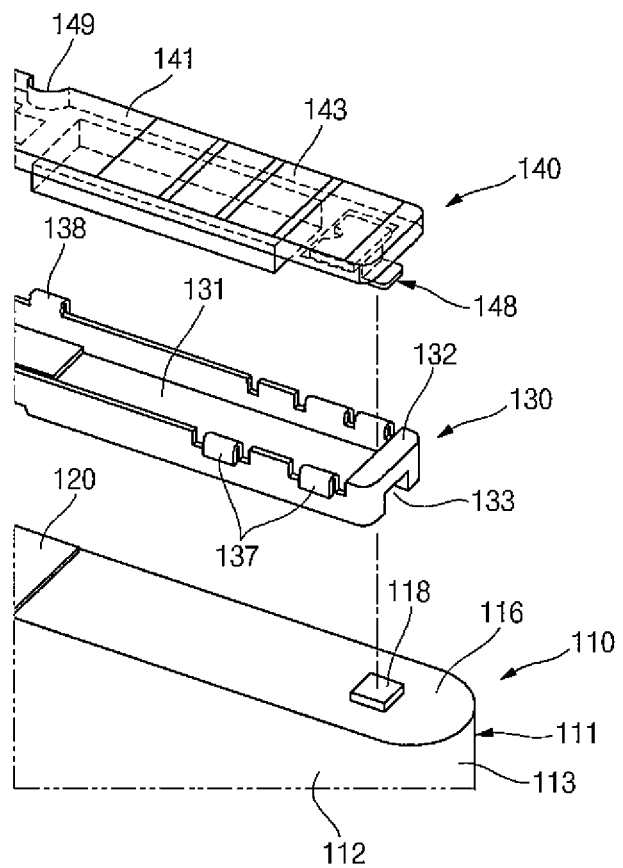
FIGS. 3A and 3B are an exploded perspective view and an exploded cross-sectional view, respectively, illustrating a battery cell, an insulation holder and a protection circuit module in the battery pack shown in FIG. 1.
Figure 3B:
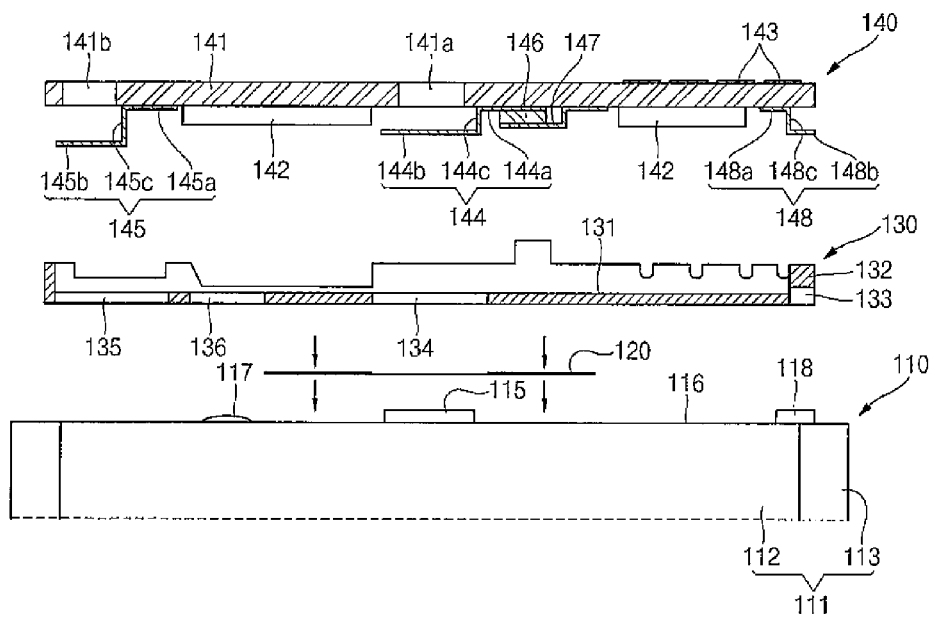

FIGS. 3A and 3B are an exploded perspective view and an exploded cross-sectional view illustrating a battery cell, an insulation holder and a protection circuit module in the battery pack shown in FIG. 1.

As shown in FIGS. 3A and 3B, the fixing tab 148 is attached to a bottom surface of one side of the circuit board 141 as one component of the protection circuit module 140. In other words, the plurality of external terminals 143 are formed on a top surface of the one side of the circuit board 141, and the fixing tab 148 is attached to the bottom surface of the one side of the circuit board 141 corresponding to the top surface of the one side of the circuit board 141. In one embodiment, the fixing tab 148 does not extend beyond a widthwise end of the circuit board 141. Therefore, as described above, even when the distance between the external terminal 143 and the short side surfaces 113 of the battery cell 110 is smaller than approximately 6.5 mm, the fixing tab 148 can firmly and stably fix the protection circuit module 140 to the insulation holder 130 and/or the battery cell 110.

In one embodiment, the fixing tab 148 includes a first region 148a fixed to the circuit board 141, a second region 148b passing through the fixing hole 133 of the insulation holder 133 and making contact with or being coupled to the fixing member 118 of the battery cell 110, and a third region 148c connecting the first and second regions 148a and 148b. In addition, the first and second regions 148a and 148b are formed at locations at which they do not overlap each other in a vertical direction, and are parallel to each other. Further, the first region 148a and the third region 148c are bent with respect to each other, and the second region 148b and the third region 148c are also bent with respect to each other.

In addition, the circuit board 141 includes a first throughhole 141a and a second throughhole 141b spaced from each other. A first conductive tab 144 is positioned in the vicinity of a bottom portion of the first throughhole 141a and a second conductive tab 145 is positioned in the vicinity of a bottom portion of the second throughhole 141b. The first conductive tab 144 includes a first region 144a connected to a temperature sensitive device 146, a second region 144b connected to the electrode terminal 115 of the battery cell 110, and a third region 144c connecting the first and second regions 144a and 144b. Here, the temperature sensitive device 146 is electrically connected to the circuit board 141 by a separate conductive lead 147. The temperature sensitive device 146 means a device whose resistance value varies according to the temperature of the battery cell 110.

In addition, the second conductive tab 145 includes a first region 145a electrically connected to the circuit board 141, a second region 145b connected to the battery cell 110, and a third region 145c connecting the first and second regions 145a and 145b. Like the fixing tab 148, the second conductive tab 145 may not extend beyond a widthwise end of the circuit board 141. In addition, the first and second regions 145a and 145b of the second conductive tab 145 are formed at locations at which they do not overlap each other in a vertical direction, and are parallel to each other. Further, the first region 145a and the third region 145c are bent with respect to each other, and the second region 145b and the third region 145c are also bent with respect to each other.

The insulation holder 130 includes a bottom surface 131 adhered to the cap plate 116 of the battery cell 110 by the adhesion member 120 and side surfaces 132 extending away from the bottom surface 131 to mount the protection circuit module 140 thereon. In addition, the fixing hole 133 is formed to be defined by the bottom surface 131 and the side surfaces 132. The fixing member 118 of the battery cell 110 is coupled and fixed to the fixing hole 133. In addition, the bottom surface 131 of the insulation holder 130 includes a first opening 134 and a second opening 135 spaced from each other. Accordingly, the first opening 134 is formed at a region substantially corresponding to the first throughhole 141a and the second opening 135 is formed at a region substantially corresponding to the second throughhole 141b.

Here, the second region 144b of the first conductive tab 144 is electrically connected to the electrode terminal 115 passing through the first opening 134 of the insulation holder 130, and the second region 145b of the second conductive tab 145 passes through the second opening 135 of the insulation holder 130 to then be electrically connected to the cap plate 116 of the battery cell 110.

In addition, the bottom surface 131 of the insulation holder 130 further includes a third opening 136, which corresponds to the plug 117 provided in the battery cell 110. Therefore, the protruding plug 117 and the bottom surface 131 of the insulation holder 130 do not interfere with each other.

The battery cell 110 includes the cap plate 116 closing the can 111, and the electrode terminal 115, the plug 117 and the fixing member 118 are formed on the cap plate 116. In one embodiment, the electrode terminal 115 is formed at a region corresponding to the first opening 134, and the plug 117 is formed at a region corresponding to the third opening 136. In addition, the fixing member 118 is formed at a region corresponding to the fixing hole 133 of the insulation holder 133 and is coupled and fixed to the fixing hole 133 of the insulation holder 133. Therefore, while the insulation holder 130 is adhered to the cap plate 116 by the adhesion member 120, the fixing hole 133 of the insulation holder 133 is coupled and fixed to the fixing member 118 of the cap plate 116, thereby preventing the insulation holder 130 from moving over the cap plate 116 in the vertical direction and/or the horizontal direction.

Figure 4:
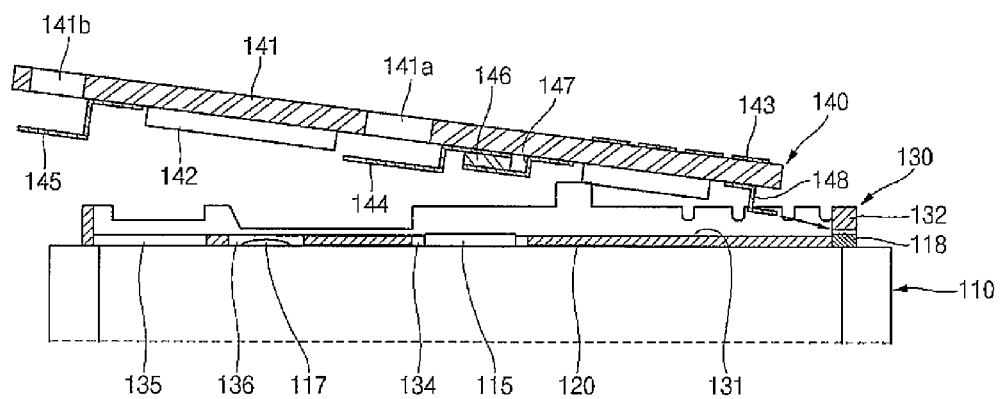
FIG. 4 illustrates a method of coupling a protection circuit module to an insulation holder in the battery pack shown in FIG. 1.

FIG. 4 illustrates a method of coupling a protection circuit module to an insulation holder in the battery pack shown in FIG. 1.

As shown in FIG. 4, in a state in which the insulation holder 130 is adhered onto the cap plate 116 of the battery cell 110 by the adhesion member 120 and the fixing member 118 provided on the cap plate 116 is coupled and fixed to the fixing hole 133 of the insulation holder 133, the protection circuit module 140 is mounted on the insulation holder 130.

In one embodiment, the fixing tab 148 provided in the protection circuit module 140 passes through the fixing hole 133 of the insulation holder 133 to then be coupled thereto, and the fixing tab 148 makes contact with a top surface of the fixing member 118 provided in the cap plate 116. In other words, the fixing tab 148 of the protection circuit module 140 passes through the fixing hole 133 of the insulation holder 133 to make contact with and/or to be fixed to the fixing member 118 provided in the cap plate 116 in a non-welding manner. In practice, the second region 148b of the fixing tab 148 is fitted into the fixing hole 133 of the insulation holder 133, thereby allowing the second region 148b of the fixing tab 148 to be inserted into a portion between the fixing member 118 and the insulation holder 130.

Figure 5A:
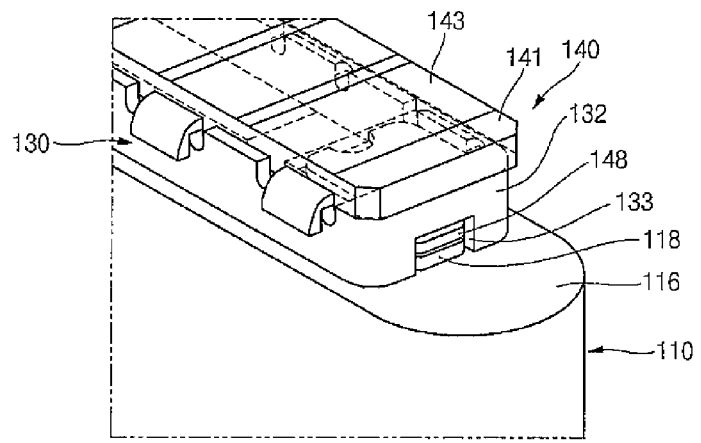
FIG. 5A is an exploded perspective view illustrating a state in which a fixing tab of a protection circuit module is fixed to an insulation holder in the battery pack shown in FIG. 1.
Figure 5B:
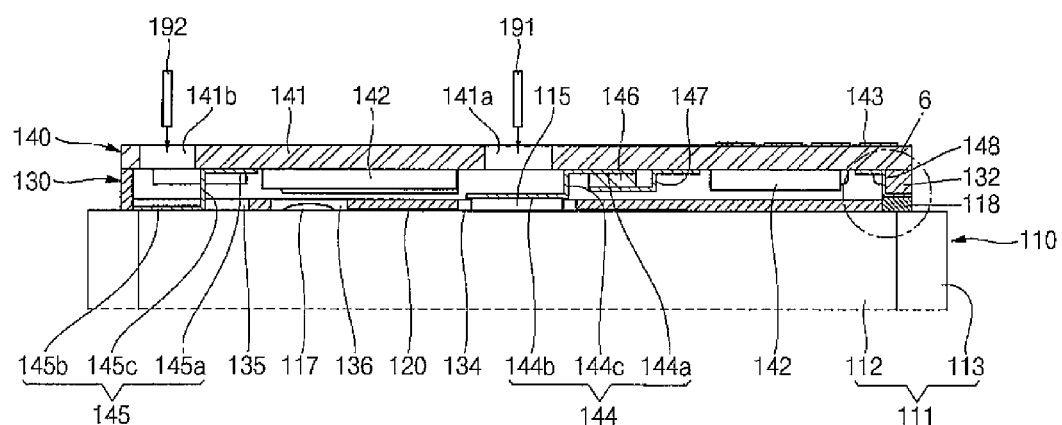
FIG. 5B is a cross-sectional view illustrating a state in which a conductive tab of a protection circuit module is fixed to a battery cell.

FIG. 5A is an exploded perspective view illustrating a state in which a fixing tab of a protection circuit module is fixed to an insulation holder in the battery pack shown in FIG. 1, and FIG. 5B is a cross-sectional view illustrating a state in which a conductive tab of a protection circuit module is fixed to a battery cell.

As shown in FIG. 5A, the fixing tab 148 provided in the protection circuit module 140 is fitted into the fixing hole 133 of the insulation holder 133 to then be fixed to the fixing member 118 of the battery cell 110. As shown in FIG. 5B, the first conductive tab 144 and the second conductive tab 145 are electrically connected and fixed to the battery cell 110.

In more detail, the second region 144b of the first conductive tab 144 may be welded to the electrode terminal 115 of the battery cell 110 by laser welding. In one embodiment, a laser welding device 191 transmits laser beams to the second region 144b of the first conductive tab 144 through the first throughhole 141a provided in the protection circuit module 140 and the electrode terminal 115 is positioned inside the first opening 134 of the insulation holder 130.

In addition, the second region 145b of the second conductive tab 145 may be laser-welded to the cap plate 116 of the battery cell 110. In one embodiment, a laser welding device 192 transmits laser beams to the second region 145b of the second conductive tab 145 through the second throughhole 141b provided in the protection circuit module 140 and the second region 145b of the second conductive tab 145 passes through the second opening 135 of the insulation holder 130 to then be welded to the cap plate 116.

Although laser welding has been described by way of example, welding methods other than the laser welding, including ultrasonic welding, resistance welding, and equivalents thereof, may also be employed, but aspects of the present invention are not limited thereto.

In such a manner, the protection circuit module 140 is electrically connected and fixed to the electrode terminal 115 of the battery cell 110 through the first conductive tab 144 and is electrically connected and fixed to the cap plate 116 of the battery cell 110 through the second conductive tab 145, thereby allowing the protection circuit module 140 to be fixed to the fixing member 118 of the battery cell 110 through the fixing tab 148 in the hook manner and/or the non-welding manner. The insulation holder 130 is adhered to the cap plate 116 of the battery cell 110 by the adhesion member 120. Accordingly, even if the external terminal 143 of the protection circuit module 140 is positioned within a distance of approximately 6.5 mm away from the short side surfaces 113 of the battery cell 110, one region of the protection circuit module 140 corresponding to the external terminal 143 is firmly and stably fixed to the battery cell 110 or the insulation holder 130. Additionally, the other region of the protection circuit module 140, opposite to the one region of the protection circuit module 140, is fixed to the cap plate 116 of the battery cell 110 by the second conductive tab 145, thereby allowing opposite ends of the protection circuit module 140 to be firmly and stably fixed to the battery cell 110.

Figure 6:
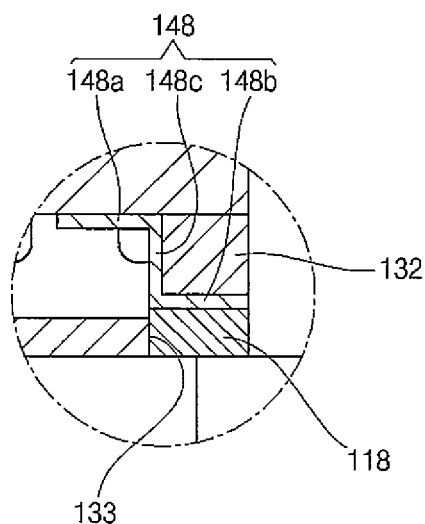
FIG. 6 is an enlarged cross-sectional view illustrating a portion 6 of FIG. 5B.

FIG. 6 is an enlarged cross-sectional view illustrating a portion 6 of FIG. 5B.

As shown in FIG. 6, the substantially hexahedral fixing member 118 provided in the battery cell 110 and upwardly protruding is coupled to the fixing hole 133 provided in the insulation holder 130, and the second region 148b of the fixing tab 148 provided in the protection circuit module 140 is coupled to the fixing hole 133 and makes contact with the top surface of the fixing member 118. Consequently, the second region 148b of the fixing tab 148 is inserted into a portion between the fixing member 118 and the insulation holder 130. In addition, the third region 148c of the fixing tab 148 may make close contact with the side surfaces 132 of the insulation holder 130.

Figure 7A:
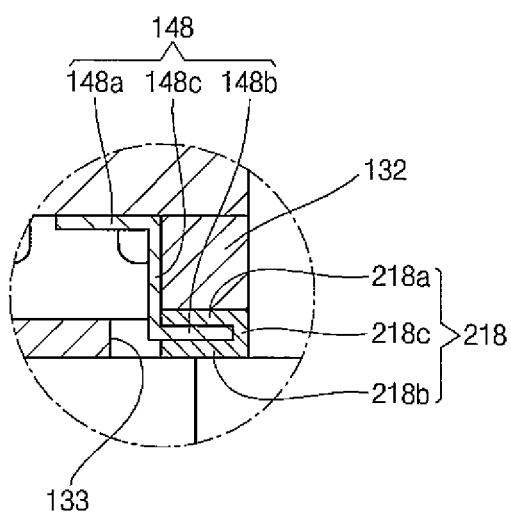
FIGS. 7A to 7C are enlarged cross-sectional views illustrating connection relationships between a fixing tab and an insulation holder or a battery cell.
Figure 7B:
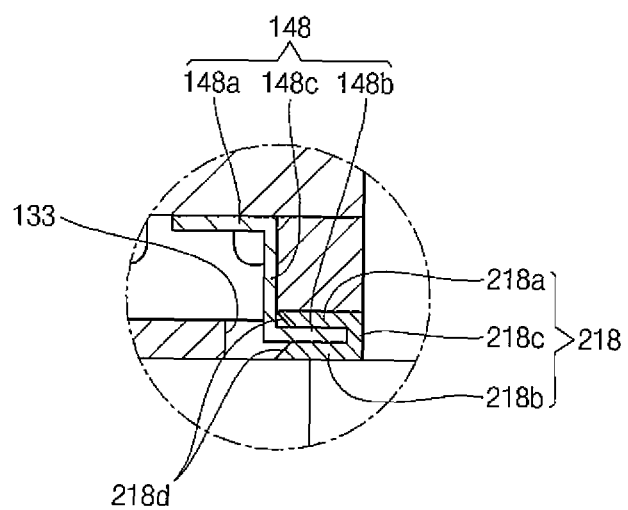
Figure 7C:
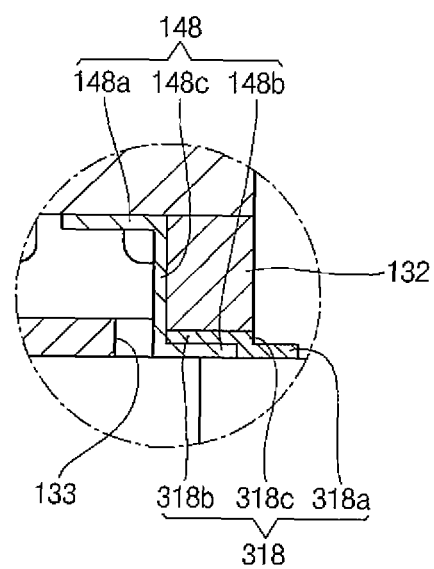

FIGS. 7A to 7C are enlarged cross-sectional views illustrating connection relationship between a fixing tab and an insulation holder or a battery cell.

As shown in FIG. 7A, the fixing member 218 may include first and second regions 218a and 218b into which the second region 148b of the fixing tab 148 is inserted, and a third region 218c connecting the first and second regions 218a and 218b. In other words, the fixing member 218 is fitted into the fixing hole 133 of the insulation holder 130, and the fixing tab 148 of the protection circuit module 140 may be inserted into a space between the first and second regions 218a and 218b of the fixing member 218. In one embodiment, the first and second regions 218a and 218b of the fixing member 218 are formed at regions vertically overlapping each other and spaced from each other and parallel to each other. In addition, the second region 218c of the fixing member 218 is fixed to the cap plate 116 of the battery cell 110.

As shown in FIG. 7B, chamfers 218d may further be provided in the first and second regions 218a and 218b forming the fixing member 218. Therefore, the second region 148b of the fixing tab 148 may be easily inserted into the space between the first and second regions 218a and 218b of the fixing member 218.

As shown in FIG. 7C, the fixing member 318 includes a first region 318a fixed to the cap plate 116 of the battery cell 110, a second region 318b coupled to the fixing hole 133 of the insulation holder 130, and a third region 318c connecting the first and second regions 318a and 318b. In one embodiment, the first and second regions 318a and 318b are formed at regions vertically not overlapping each other to be spaced from each other and parallel to each other. Therefore, the second region 148b of the fixing tab 148 may be inserted into a space between the second region 318b of the fixing member 318 and the cap plate 116 of the battery cell 110.

In addition, according to the present invention, various types of fixing members may be provided on the cap plate, but aspects of the present invention are not limited to those illustrated and described herein. Further, a fixing member may be separately provided to then be welded to the cap plate. Alternatively, the cap plate may be subjected to a press processing method, thereby allowing the fixing member to protrude and extend from the cap plate.

In addition, in the illustrated embodiments of the present invention, the fixing tab functions to mechanically fix the protection circuit module to the insulation holder and/or the battery cell, but aspects of the present invention are not limited thereto. Rather, the fixing tab may also function to electrically connect the protection circuit module to the battery cell.

The battery pack according to an exemplary embodiment has been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A battery pack comprising:
   a battery cell;
   an insulation holder coupled to the battery cell, the insulation holder having a fixing hole; and
   a protection circuit module coupled to the insulation holder, the protection circuit module having a fixing tab, wherein the fixing tab is fixed to the battery cell through the fixing hole and is fixed to the fixing member,
   wherein the protection circuit module comprises:
   a circuit board having a first throughhole and a second throughhole spaced from each other;
   a first conductive tab positioned at a region generally corresponding to the first throughhole and electrically connecting the battery cell and the circuit board; and
   a second conductive tab positioned at a region generally corresponding to the second throughhole and electrically connecting the battery cell and the circuit board, and
   wherein the insulation holder includes a first opening formed at a location generally corresponding to the first throughhole, and a second opening formed at a location generally corresponding to the second throughhole.

2. The battery pack as claimed in claim 1, wherein the battery cell includes short side surfaces, wherein the protection circuit module includes an external terminal, and wherein a distance between the short side surfaces and the external terminal is less than about 6.5 mm.

3. The battery pack as claimed in claim 1, wherein the battery cell further includes a protruding fixing member, the fixing member being coupled to the insulation holder via the fixing hole, wherein the fixing tab contacts or is inserted into the fixing member.

4. The battery pack as claimed in claim 3, wherein the fixing member is shaped as a rectangular parallelepiped.

5. The battery pack as claimed in claim 3, wherein the fixing member includes:
   first and second regions spaced from and substantially parallel to each other to accommodate the fixing tab in a portion therebetween; and
   a third region connecting the first and second regions to each other.

6. The battery pack as claimed in claim 5, wherein each of the first and second regions is chamfered.

7. The battery pack as claimed in claim 3, wherein the fixing tab includes:
   a first region attached to the protection circuit module;
   a second region contacting or inserted into the fixing member; and
   a third region connecting the first region and the second region.

8. The battery pack as claimed in claim 1, wherein the insulation holder is adhered to the battery cell by an adhesion member.

9. The battery pack as claimed in claim 1, wherein the insulation holder includes:
   a bottom surface adhered to the battery cell; and
   side surfaces extending away from the bottom surface to accommodate the protection circuit module thereon,
   wherein the fixing hole is defined by the bottom surface and the side surfaces.

10. The battery pack as claimed in claim 1, wherein the battery cell further includes an electrode terminal located inside the first opening, and wherein the first conductive tab is connected to the electrode terminal.

11. The battery pack as claimed in claim 1, wherein the battery cell further includes a cap plate and wherein the second conductive tab is connected to the cap plate while passing through the second opening.

12. The battery pack as claimed in claim 11, wherein the second conductive tab includes:
   a first region electrically connected to the circuit board;
   a second region electrically connected to the cap plate; and
   a third region connecting the first region and the second region,
   wherein the second region is formed at locations generally corresponding to the second throughhole and the second opening.

13. The battery pack as claimed in claim 1, wherein the insulation holder further includes a third opening spaced from the first and second openings, and wherein the battery cell further includes an injection hole plug formed at a location generally corresponding to the third opening.

14. The battery pack as claimed in claim 1, further comprising an upper cover coupled to the battery cell and surrounding the insulation holder and the protection circuit module.

15. The battery pack as claimed in claim 14, further comprising a label wrapped around the battery cell and the upper cover.

* * * * *